United States Patent [19]

Fenelon et al.

[11] Patent Number: 5,724,813
[45] Date of Patent: Mar. 10, 1998

[54] COMPRESSOR BY-PASS AND VALVING FOR A TURBOCHARGER

[75] Inventors: Thomas R. Fenelon, Chillicothe; Robert L. Hercey, Peoria, both of Ill.; Gerald A. Hill, Lafayette, Ind.

[73] Assignee: Caterpillar Inc., Peoria, Ill.

[21] Appl. No.: 592,818

[22] Filed: Jan. 26, 1996

[51] Int. Cl.$^6$ .................................................. F02B 37/00
[52] U.S. Cl. .......................................... 60/606; 60/611
[58] Field of Search ............................. 60/606, 611

[56] References Cited

U.S. PATENT DOCUMENTS

| | | | |
|---|---|---|---|
| 3,676,999 | 7/1972 | Oldfield | 60/606 |
| 3,988,894 | 11/1976 | Melchior | 60/606 |
| 4,077,219 | 3/1978 | Melchior et al. | 60/599 |
| 4,089,173 | 5/1978 | Melchior et al. | 60/606 |
| 4,215,550 | 8/1980 | Dinger et al. | 60/606 |
| 4,233,815 | 11/1980 | Melchior | 60/606 |
| 4,287,717 | 9/1981 | Oldfield et al. | 60/606 |
| 4,328,672 | 5/1982 | Zumstein | 60/606 |
| 4,373,336 | 2/1983 | Horler et al. | 60/606 |
| 4,378,677 | 4/1983 | Zumstein | 60/606 |
| 4,509,331 | 4/1985 | Hirabayashi | 60/602 |
| 4,559,784 | 12/1985 | Jenny et al. | 60/606 |
| 4,561,253 | 12/1985 | Curtil | 60/606 |
| 4,616,481 | 10/1986 | Melchior et al. | 60/606 |
| 4,742,681 | 5/1988 | Haberkern et al. | 60/606 |
| 4,785,635 | 11/1988 | Melchior et al. | 60/606 |
| 4,833,886 | 5/1989 | Meier | 60/602 |
| 5,029,442 | 7/1991 | Nishiyam | 60/606 |
| 5,551,236 | 9/1996 | Zimmer et al. | 60/611 |

FOREIGN PATENT DOCUMENTS

| | | | |
|---|---|---|---|
| 3539578 | 6/1986 | Germany | 60/606 |

*Primary Examiner*—Michael Koczo
*Attorney, Agent, or Firm*—Fred J. Baehr

[57] ABSTRACT

A bypass system for a diesel engine having a turbocharger, a bypass conduit, a valve and a controller which cooperate to bypass a portion of the combustion air compressed by the turbocharger bypassed to a turbine portion of the turbocharger or to the atmosphere, a controller containing maps based on empirical fixed point data specific to the engine, turbocharger and bypass system responds to signals indicative of changes in atmospheric pressure, inlet manifold pressure and engine speed to control the valve and prevent the turbocharger from surging.

3 Claims, 5 Drawing Sheets

Fig_1_

Fig_2_

5,724,813

1

COMPRESSOR BY-PASS AND VALVING FOR A TURBOCHARGER

TECHNICAL FIELD

The invention relates to a turbocharger or supercharger for a diesel or any internal combustion engine and more particularly to a bypass arrangement which selectively bypasses inlet or combustion air supplied by a compressor portion of a turbocharger. Turbochargers supply combustion air to the engine at a higher pressure and density than atmospheric pressure to either make up for a loss of power due to altitude or to increase the power that can be obtained from engines of a given piston displacement, thus reducing the cost, weight, or space occupied by an engine of a given power output. A turbine portion of the turbocharger utilizes the exhaust gases from the engine as the driving or working fluid, as it contains useful energy in the form of pressure and heat energy. However, unless the engine operates at constant speed and power output, the energy in the working fluid varies an appreciable amount and can cause the compressor portion to try to operate in a region of unstable operation, wherein the flow will pulsate so that there is back flow through the suction with violent hunting, pumping and surging.

Bypassing a portion of the combustion air supplied to the inlet manifold to the turbine portion of a turbocharged diesel engine is well known in the prior art. Horler et al. in U.S. Pat. No. 4,373,336 describes a bypass line comprising an adjustable throttle member for adapting the quantity of bypassed gas to the respective operating state of the engine. An actuating piston closes the throttle member in response to pressure from the compressor side above a preselected value. The actuating piston is disposed on the side of the throttle member facing away from the air intake manifold. The resistance of the valve to flow from the compressor side to the turbine side is less than the resistance in the opposite direction. The resistance to flow, and the fully unseated valve position define an operating curve of the engine which is adjustable. The throttle member can close before the maximum engine output point is reached.

SUMMARY OF THE INVENTION

Among the objects of the invention may be noted the provision of a bypass system for an internal combustion having a turbocharger wherein the bypass system bypasses a portion of the combustion air to prevent a compressor portion of the turbocharger from surging. The bypass system utilizes an improved controller tuned to the engine, turbocharger and bypass system to provide a dependable, effective and economical bypass system.

In general, an internal combustion engine, when made in accordance with this invention, comprises an inlet manifold for supplying combustion air to the engine, an exhaust manifold for collecting products of combustion from the engine and a turbocharger with a turbine portion and a compressor portion mechanically connected to a common rotatable drive shaft. The turbine portion of the turbocharger is in fluid communication with the exhaust manifold and is driven by the products of combustion from the engine. A rotatable shaft couples the turbine portion to the compressor portion driving it to compress the inlet or combustion air. The compressor portion of the turbocharger is in fluid communication with an after cooler which cools the compressed dense air before it enters the inlet manifold. A bypass conduit is disposed in fluid communication with the

2 compressor portion and the turbine portion of the turbocharger. Alternately, the bypass conduit can be disposed in fluid communication with the compressor portion of the turbocharger and in fluid communication with an exhaust duct disposed down stream of the turbine portion of the turbocharger, completely bypassing the turbine portion of the turbocharger. The bypass conduit has a bypass valve disposed therein to control the flow of combustion flowing through the bypass conduit. A controller is cooperatively associated with the bypass valve and contains maps or tables of fixed data points determined empirical from tests tuned to the engine, turbocharger and bypass system. The controller uses these maps to respond to changes in inlet manifold pressure, atmospheric pressure and engine speed to modulate the bypass valve to prevent the turbocharger from surging.

A method of preventing surging in a turbocharger, utilized in this invention, comprises the steps of: providing a bypass valve to selectively bypass combustion air to the turbine portion of the turbocharger or to the atmosphere, bypassing the turbine portion of the turbocharger; providing the controller with maps based on empirical data in the form of tables specific to the engine, turbocharger and bypass system and utilizing these maps to respond to changes in inlet manifold pressure, atmospheric pressure and engine speed to modulate the bypass valve to prevent the turbocharger from surging.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 1:
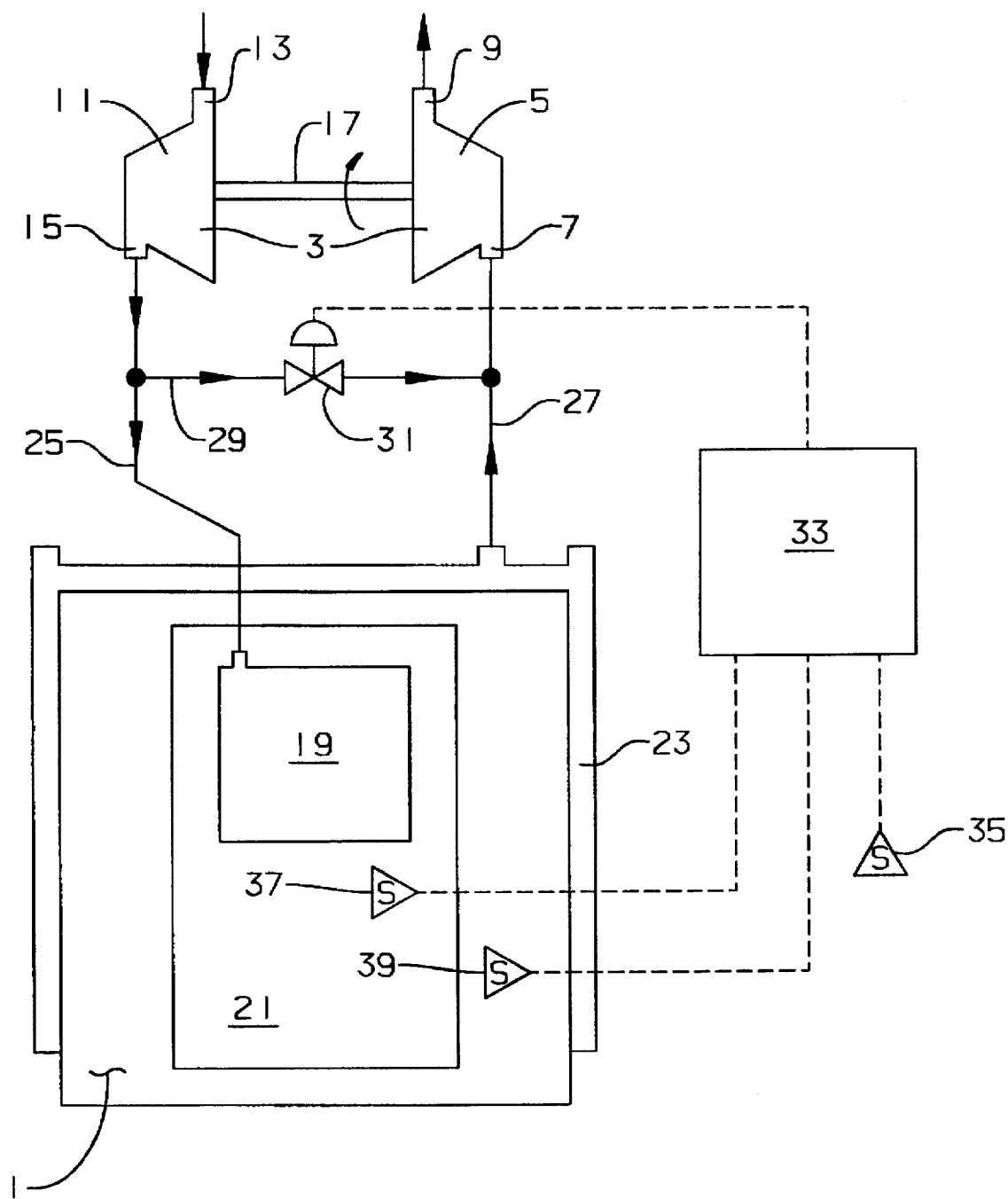
FIG. 1 is a schematic view of an internal combustion engine with a turbocharger and a bypass system made in accordance with this invention.

Referring now to the drawings in detail and in particular to FIG. 1 there is shown an internal combustion engine 1, which may be a diesel or a ignition engine and either a two or four cycle engine. The engine 1 has a turbocharger or supercharger 3 cooperatively associated therewith to supply combustion air to the engine 1 at an elevated pressure and density. The turbocharger 3 comprises a turbine portion 5 having a inlet port 7 and an exhaust port 9, a compressor portion 11 having a inlet port 13 and an outlet port 15, and a rotatable shaft 17 mechanically connecting the turbine portion 5 and the compressor portion 11. The turbine and compressor portions 5 and 11 may be either axial or centrifugal flow, the latter being preferred for lower compression ratios. The engine 1 has an after cooler 19 for reducing the temperature of the combustion air as the compressor portion 11 of the turbocharger 3 adds heat and pressure energy to the air it compresses. The after cooler 19 is disposed in fluid communication with an intake manifold 21, which supplies combustion air to multiple cylinders (not shown) disposed within the engine 1. The products of combustion or exhaust gasses produced in the multiple cylinders of the engine 1 during the combustion process are exhausted to an exhaust manifold 23.

An intake conduit 25 is in fluid communication with the outlet port 15 of the compressor portion 11 of the turbocharger 3, the after cooler 19 and the intake manifold 21 to supply combustion air to the engine 1.

An optional exhaust conduit 27 is in fluid communication with the exhaust manifold 23 and the inlet port 7 of the turbine portion 5 to supply exhaust gases to the turbine portion 5 of the turbocharger 3. The exhaust gases act as the driving or motive fluid for the turbine and mechanically connected compressor portions 5 and 11, respectively, of the turbocharger 3 as the exhaust gases contain sufficient heat and pressure energy to drive the turbine portion 5 of the turbocharger 3.

A bypass conduit 29 is disposed in fluid communication with the intake conduit 25 and the exhaust conduit 27 up stream of the after cooler 19. The bypass conduit 29 has a bypass valve 31 or other flow control means disposed therein to control or regulate the flow of bypass inlet or combustion air to the exhaust conduit 27 and turbine portion 5 of the turbocharger 3. In certain instances system performance may be improved by connecting the bypass conduit 29 to the exhaust manifold 23 instead of to the exhaust conduit 27 as shown to promote thorough mixing and, thus homogenity, of the combustion air and exhaust gas. As used herein, the term "combustion air" may consititute air or a mixture of air and another gas such as propane or natural gas. The bypass conduit 29 is disposed upstream of the after cooler 19 as the combustion air leaving the compressor portion 11 of the turbocharger 3 has heat and pressure which can be recovered by the turbine portion 5 of the turbocharger 3.

An engine controller 33, such as a engine electronic control module, contains a series of maps based on engine speed and is cooperatively associated with an atmospheric pressure sensor 35, an inlet manifold pressure sensor 37 and an engine speed sensor 39, to respond to changes in atmospheric pressure signals, intake manifold pressure signals sent by an intake manifold pressure signals and to engine speed signals to modulate the bypass valve 31 and prevent the compressor portion 11 of the turbocharger 3 from surging. The maps are in the form of tables typically compiled from empirical data in the form of fixed data points taken and tabulated from performance tests tuned to a fixed hardware or a specific configuration of the engine 1, turbocharger 3 and bypass system, which includes the bypass valve 31 and bypass conduit 29. As a plurality of fixed data points are used as the basis of the maps, interpolation of areas between the data points is made by the controller 33 to provide continuous and smooth operation and modulation of the bypass valve 31. The maps may be stored in memory incorporated in the engine electronic control module or controller 33.

Figure 2:
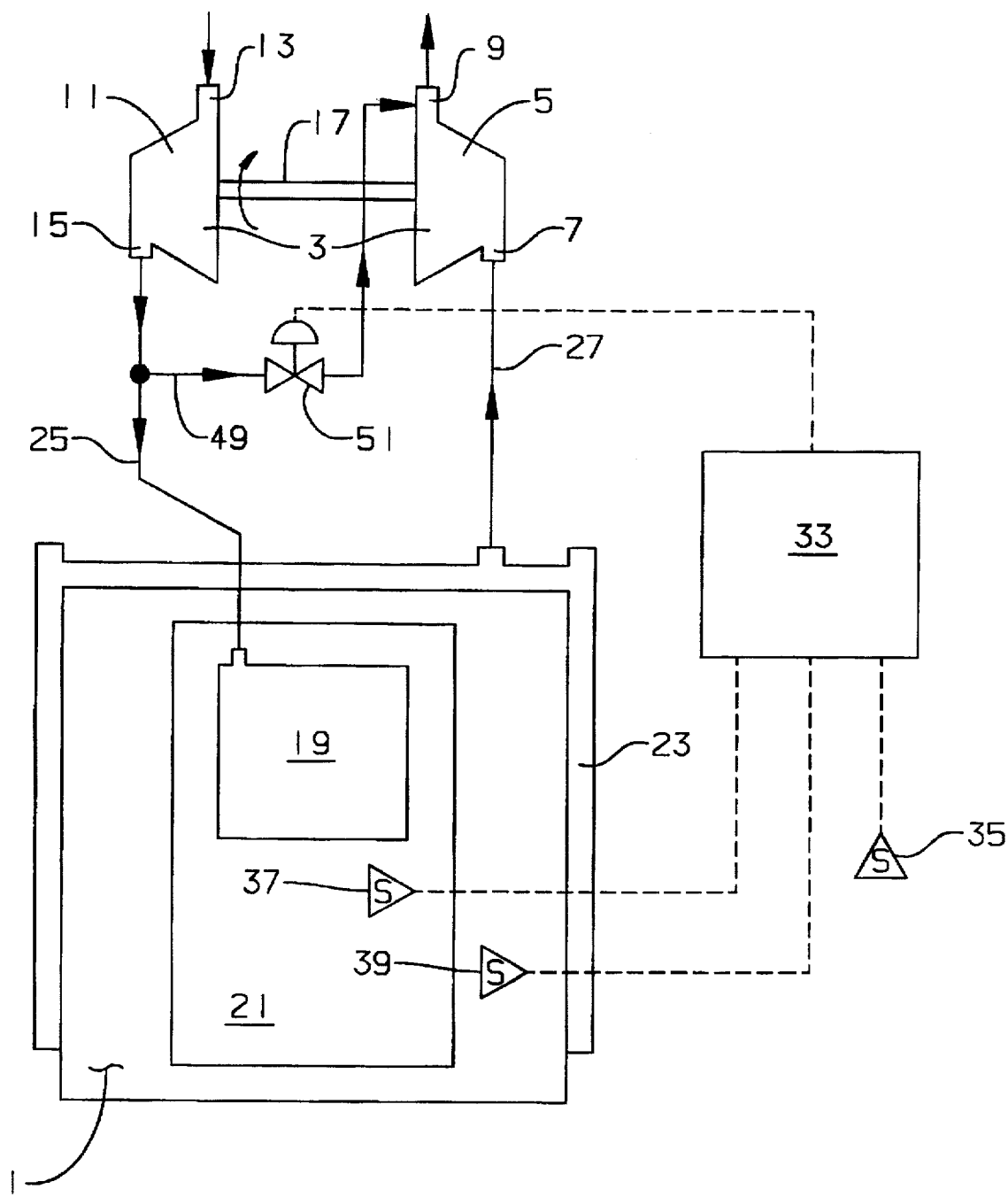
FIG. 2 is a schematic view of an internal combustion engine with a turbocharger and an alternative bypass system made in accordance with this invention.

FIG. 2 shows an internal combustion engine 1 similar to the engine shown in FIG. 1 and may also be a diesel or spark ignition engine and either a two or four cycle engine. The engine 1 has a turbo charger or supercharger 3 cooperatively associated therewith to supply combustion air to the engine 1 at an elevated pressure and density. The turbocharger 3 comprises a turbine portion 5 having a inlet port 7 and an exhaust port 9, a compressor portion 11 having a inlet port 13 and an outlet port 15, and a rotatable shaft 17, mechanically connecting the turbine portion 5 and the compressor portion 11. The turbine and compressor portions 5 and 11 may be either axial or centrifugal flow, the latter being preferred for lower compression ratios. The engine 1 also has an after cooler 19 in fluid communication with a intake manifold 21 which supplies combustion air to multiple cylinders (not shown) in the engine 1. The products of combustion or exhaust gasses are exhausted from the multiple cylinders (not shown) within the engine 1 to an exhaust manifold 23.

An intake conduit 25 is disposed in fluid communication with the outlet port 15 of the compressor portion 11 of the turbocharger 3, the after cooler 19 and the intake manifold 21 to supply combustion air to the engine 1.

An exhaust conduit 27 is in fluid communication with the exhaust manifold 23 and the inlet port 7 of the turbine portion 5 of the turbocharger 3. The exhaust gases act as the driving or motive fluid for the turbine portion 11 of the turbocharger as they have sufficient heat and pressure energy to operate the turbine portion 5 of the turbocharger 3.

A bypass conduit 49 is disposed in fluid communication with the intake conduit 25 and the exhaust port 9 of the turbine portion 5 down stream of the turbine portion 5 of the turbocharger 3. A bypass valve 51 or other flow control means is disposed in the bypass conduit 49 to control the flow of bypass inlet air to the turbine exhaust port 9 or to the atmosphere, thereby bypassing the turbine portion 5 of the turbocharger 3.

An engine controller 33, such as a engine electronic control module, contains a series of maps or signal recognition points based on engine speed, atmospheric pressure and inlet manifold pressure, and is cooperatively associated with an atmospheric pressure sensor 35, an intake manifold pressure sensor 37, and engine speed sensor 39 to respond to changes in atmospheric pressure signals, inlet manifold signals and engine speed signals to modulate the bypass valve 51 and prevent the compressor portion 11 of the turbocharger 3 from surging. The maps are tables of empirical data taken and tabulated from performance tests tuned for a fixed hardware configuration of the engine 1, turbocharger 3 and bypass valve 51. A plurality of fixed data points are used as the basis of the maps and interpolation of areas between the data points is made by the controller 33 to provide continuous and smooth operation and modulation of the bypass valve 51. The maps may be stored in memory incorporated in the engine electronic control module or controller 33.

Figure 3:
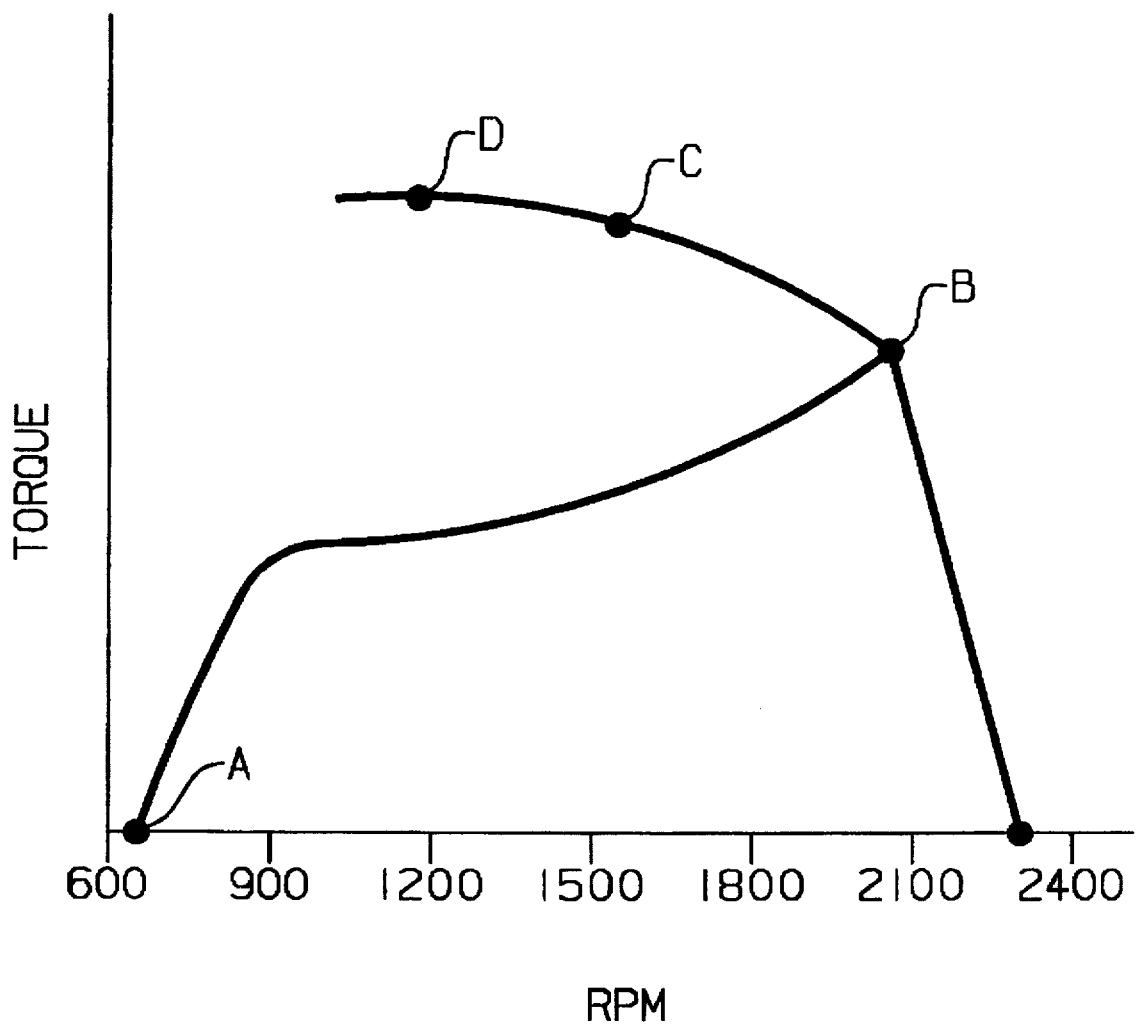
FIG. 3 is a typical engine curve showing RPM verses torque.

FIG. 3 shows a typical engine lug curve, the abscissa of the curve is revolutions per minute (RPM) and the ordinate is torque in foot pounds. The engine 1 is started with an electrical or compressed air starter (not shown) and begins to run at low speed idle. The engine lug curve shows a typical engine operation starting at point A, the low speed idle, from point A the torque and speed of the engine increases to maximum or rated power at point B, the engine speed is then reduced or lugged back to point D, the engine's peak torque.

Figure 4:
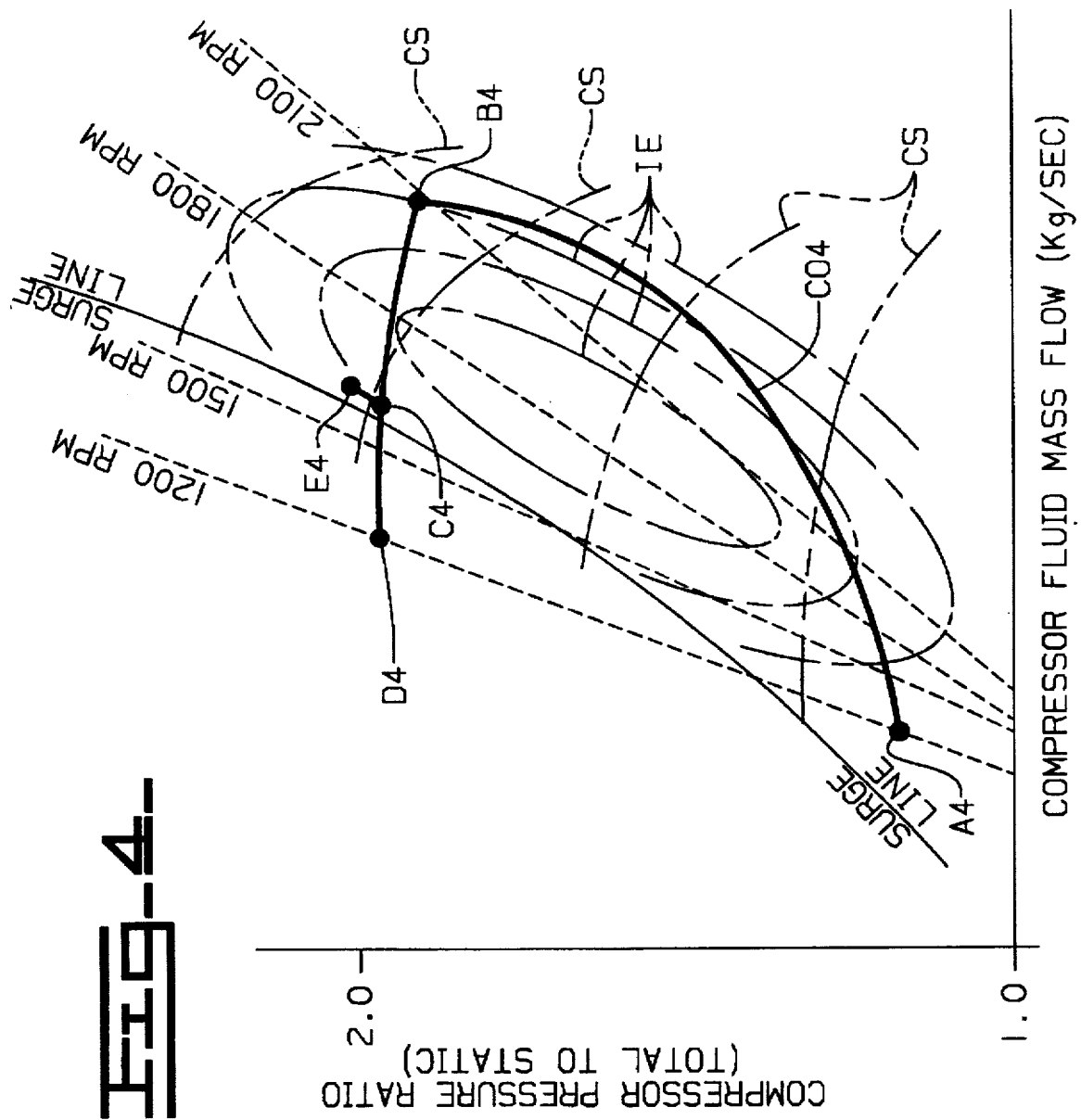
FIG. 4 is graph of the compressor performance showing compressor mass flow verses compression ratio and the operation of the bypass system shown in FIG. 1.

FIG. 4 shows a graph of the performance of a typical compressor portion 11 of a turbocharger 3, the abscissa of the graph is compressor fluid mass flow in kg/sec and the ordinate is compressor pressure ratio, total to static, and is always greater than 1:1. Fluid flowing through the compressor portion 11, referred to as compressor fluid in the Figures, may consititute air or a mixture of air and another gas such as propane or natural gas.

A surge line, sometimes called a stability limit, pumping limit or stall line is a curved line which increases with pressure ratio and compressor air mass flow and is labeled "surge line". The area to the right of the surge line is an area covering a range of pressure ratio and mass flow in which the compressor operation is stable. If the pressure ratio and mass flow coordinates reside on the left side of the surge line, the operation of the compressor is unstable, characterized by rapid pressure fluctuations and a surging of the fluid within the compressor.

Contour lines on the right side of the surge line represent compressor isentropic efficiency indicated as IE.

Compressor speed in revolutions per minute, RPM, is represented by a group of curved lines starting at the surge line and curving downwardly and to the right and are indicated as CS.

Engine characteristic breathing lines are a series of approximately straight lines extending upwardly and from left to right indicating the engine speed in revolutions per minute, RPM, and the mass flow of fluid at various pressure ratios.

A heavy curved line CO4 indicates compressor operation or the operation of the compressor portion 11 of the turbocharger 3 when the engine 1 is operated in the typical mode shown in FIG. 3. It also shows the operation of the compressor portion 11 with and without the bypass valve 31 and the engine controller 33 being in operation. When in operation the engine controller 33 modulates the bypass valve 31 to bypass a portion of the combustion air from the intake conduit 25 to the exhaust conduit 27 so that the bypassed portion of combustion air flows with the exhaust gasses into the inlet of the turbine portion 5 of the turbocharger 3, as shown in FIG. 1. The heavy curved line CO4 starts at a point A4, low speed idle, as the torque and speed of the engine increases to maximum or rated power the mass flow and pressure ratio also increase to point B4. If the engine speed is reduced or lugged back to its peak torque, the compressor mass flow and pressure ratio decrease going to point D4.

Point D4 is over on the left hand side of the surge line, resulting in unstable conditions within the compressor portion 11 of the turbocharger 3, wherein the flow will pulsate, so there is back flow through the intake 13 accompanied by violent hunting, and surging.

However, if the controller 33 operates or modulates the bypass valve 31 in response to signals from the atmospheric pressure sensor 35, intake manifold pressure sensor 37 and engine speed sensor 39, the by pass valve 31 will begin to open at point C4, as the operating condition approaches a surging operation condition, which is at about 1550 engine RPM and continue to open as the speed continues to decrease resulting in the compressor mass flow and compression ratio going from point C4 to point E4, thus remaining on the stable or right hand side of the surge line and continuing to operate in a stable condition even though the speed of the engine is reduced.

The compressed inlet air bypassed to the turbine portion 5 of the turbocharger 3 has heat and pressure energy, which is recovered by the turbine portion 5 of the turbocharger causing a slight increase in the mass flow and pressure in the compressor portion 11 of the turbocharger 3, and though slight, this increase is sufficient to prevent the compressor portion 11 of the turbocharger 3 from surging. When the engine speed is then increased, the sensors send signals of increased intake manifold pressure and increased engine speed to the controller 33, which responds to these changes by beginning to close the bypass valve 31 and sending more combustion air to the engine 1. An increase in compressor mass air flow is away from the surge line into the stable operating range of the compressor 11.

Figure 5:
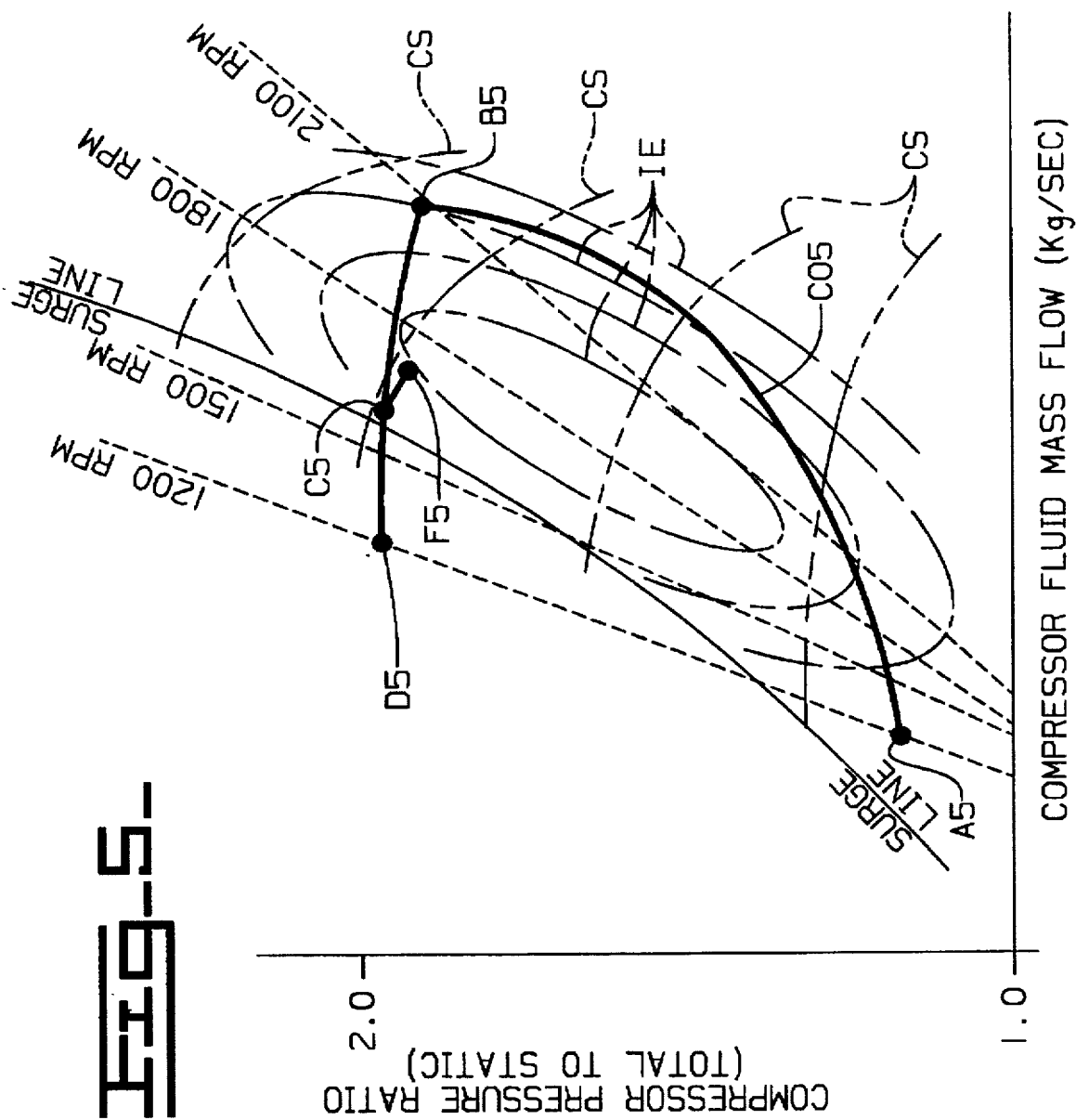
FIG. 5 is a graph of compressor performance showing compressor mass flow verses compression ratio and the operation of the bypass system shown in FIG. 2.

FIG. 5 shows a graph of the performance of a typical compressor portion 11 of a turbocharger 3, the abscissa of the graph is the compressor air mass flow in kg/sec and the ordinate is the compressor pressure ratio, total to static, and is always greater than 1:1.

A surge line, sometimes called a stability limit, pumping limit or stall line is a curved line which increases with pressure ratio and compressor air mass flow and is labeled "surge line". In an area to the right of the surge line is an area covering a range of pressure ratio and mass flow in which the compressor operation is stable. If the pressure ratio and mass flow coordinates reside on the left side of the surge line, the operation of the compressor is unstable, characterized by rapid pressure fluctuations and a surging of the fluid within the compressor.

Contour lines on the right side of the surge line represent compressor isentropic efficiency indicated as IE.

Compressor speed in revolutions per minute, RPM, is represented by a group of curved lines starting at the surge line and curving downwardly and to the right and are indicated as CS. Engine characteristic breathing lines are a series of straight lines extending upwardly from left to right indicating the engine speed in revolutions per minute, RPM, and the mass flow of fluid at various inlet pressure or pressure ratios.

A heavy curved line CO5 indicates compressor operation or the operation of the compressor portion 11 of the turbocharger 3, when the engine 1 is operated in the typical mode shown in FIG. 3. It also shows operation of the compressor portion 11 of the turbocharger, with and without the bypass valve 51 and the controller 33, shown in FIG. 2, being in operation. When the bypass valve 51 is opened by the controller 33, a portion of the combustion air from the intake conduit 25 is bypassed to the exhaust port 9 so that the bypassed portion of the inlet or combustion air bypasses the turbine 5 and exits the system with the exhaust gasses, which have operated and passed through the turbine portion 5 of the turbocharger 3. The heavy curved line CO5 shows the compressor mass flow and pressure ratio when the engine is operated in a typical mode, shown in FIG. 3. The heavy curved line CO5 starts a point A5 where the engine 1 is at low speed idle, the torque and speed of the engine 1 is then increased to its maximum or rated power and the compressor mass air flow and pressure ratio increase to point B5. The engine speed is then reduced or lugged back to its peak torque and the compressor mass flow and compression ratio are reduced to point D5.

At point D5 the mass flow and pressure ratio of the compressor 11 is over on the left hand side of the surge line resulting in unstable conditions within the compressor portion 11 of the turbocharger 3, wherein the flow will pulsate, so there is back flow through the intake port 13 accompanied by violent hunting, and surging of the compressor portion 11 of the turbocharger 3.

However, if the controller 33 operates or modulates the bypass valve 51 in response to signals from the atmospheric pressure sensor 35, intake manifold pressure sensor 37 and engine speed sensor 39, the by pass valve 51 will begin to open when the compressor mass flow and pressure ratio reach point C5, as the operating condition approaches a surging operating condition, which is at about 1550 engine RPM and continue to open as the speed continues to decrease resulting in an increase in compressor mass flow and a slight reduction in pressure ratio. Thus the compressor mass flow and pressure ratio to go from point C5 to point F, which remains on the stable or right hand side of the surge line. Therefore the compressor portion 11 of the supercharger 3 continues to operate in a stable condition even though the speed of the engine is reduced.

Opening the bypass valve 51 reduces the inlet manifold pressure and thus the back pressure on the compressor portion 11 of the turbocharger 3 and increases the mass flow of the compressor 11, the result of these two changes are sufficient to prevent surging. When the engine speed is then increased, the sensors send a signal of increased intake manifold pressure and increased speed to the controller 33, which responds to these changes by beginning to close the bypass valve 51 and send more combustion air to the engine 1. An increase in engine speed with no change in atmospheric pressure results in and increase in compressor mass air flow which is away from the surge line and into the stable operating range of the compressor 11.

The method of preventing surging in a turbocharger 3 and engine 1 shown in FIG. 1 comprises the steps of: providing a bypass valve 31 to control the flow of combustion air from the compressor portion 11 of the turbocharger 3 to the inlet port 7 of the turbine portion 5 of the turbocharger 3 to bypass a portion of the combustion air to the turbine portion 5 of the turbocharger 3; providing a controller 33 with maps based on empirical fixed point data specific to the engine 1, turbocharger 3 and bypass system in the form of tables and utilizing the controller 33 to respond to changes in engine speed, inlet manifold pressure and atmospheric pressure and operate the bypass valve 31 to prevent the compressor portion 11 of the turbocharger 3 from surging.

The method of preventing surging in a turbocharger 3 and engine 1 shown in FIG. 2 comprises the steps of: providing a bypass valve 51 to control the flow of combustion air from the compressor portion 11 of the turbocharger 3 to the exhaust port 9 of turbine portion 5 of the turbocharger 3 to bypass a portion of the combustion air to the atmosphere; providing a controller 33 with maps based on empirical fixed point data specific to the engine 1, turbocharger 3 and bypass system in the form of tables and utilizing the controller 33 to respond to changes in engine speed, inlet manifold pressure and atmospheric pressure and operate the bypass valve 51 to prevent the compressor portion 11 of the turbocharger 3 from surging.

While the preferred embodiments described herein set forth the best mode to practice this invention presently contemplated by the inventors, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

What is claimed is:

1. A method of preventing surging in a turbocharger utilized in a diesel engine, the turbocharger having a compressor portion in fluid communication with an inlet manifold for supplying combustion air to the engine, a turbine portion in fluid communication with an exhaust manifold for directing exhaust gases from the engine to the turbine portion of the turbocharger, a bypass valve in fluid communication with the compressor and turbine portions and a controller which operates the bypass valve based on empirical fixed data points specific to the engine, turbocharger and bypass system comprising the steps of:

sensing changes in engine speed, inlet manifold pressure and atmospheric pressure, responding to these changes, the controller determining when the compressor portion of the turbocharger is approaching a surging operating condition to operate the bypass valve to bypass a portion of the combustion air from the compressor portion to the turbine portion of the turbocharger and increasing the mass flow of combustion air from the compressor portion of the turbocharger an amount sufficient to prevent the compressor portion from surging.

2. A method of preventing surging in a turbocharger as set forth in claim 1, comprising an additional step of bypassing a portion of the combustion air form the compressor portion to an inlet portion of the turbine portion of the turbocharger.

3. A method of preventing surging in a turbocharger as set forth in claim 1, comprising an additional step of bypassing a portion of the combustion air form the compressor portion to an outlet portion of the turbine portion of the turbocharger.

* * * * *